United States Patent
Hokkanen et al.

(10) Patent No.: US 11,486,117 B2
(45) Date of Patent: Nov. 1, 2022

(54) CONTROLLING EARTHMOVING MACHINES

(71) Applicant: Novatron Oy, Pirkkala (FI)

(72) Inventors: Visa Hokkanen, Tampere (FI); Mikko Vesanen, Ylöjärvi (FI)

(73) Assignee: Novatron Oy, Pirkkala (FI)

( * ) Notice: Subject to any disclaimer, the term of this patent is extended or adjusted under 35 U.S.C. 154(b) by 446 days.

(21) Appl. No.: 16/172,774

(22) Filed: Oct. 27, 2018

(65) Prior Publication Data

US 2019/0161941 A1    May 30, 2019

(30) Foreign Application Priority Data

Nov. 24, 2017 (FI) ..................................... 20176052

(51) Int. Cl.
*G05D 1/00* (2006.01)
*E02F 9/26* (2006.01)
(Continued)

(52) U.S. Cl.
CPC .............. *E02F 9/26* (2013.01); *E02F 9/2004* (2013.01); *E02F 9/205* (2013.01); *E02F 9/2012* (2013.01);
(Continued)

(58) Field of Classification Search
CPC ......... E02F 9/26; E02F 9/2004; E02F 9/2012; E02F 9/205; G01S 19/01; G05B 19/409; B05B 2219/45012; G05D 1/0011; G05D 1/0016; G05D 1/0022; G05D 1/0027; G05D 1/005; G05D 2201/0201; G08C 2201/32
(Continued)

(56) References Cited

U.S. PATENT DOCUMENTS 4,855,822 A * 8/1989 Narendra ............. G05D 1/0038
701/28
5,551,524 A * 9/1996 Yamamoto ............. B62D 11/08
701/2
(Continued)

FOREIGN PATENT DOCUMENTS

CN           1782443 A    6/2006
CN         101432529 A    5/2009
(Continued)

OTHER PUBLICATIONS

Office Action from the Finnish Patent and Registration Office for Patent Application No. 20176052, dated May 9, 2018.
Search Report for Finland Patent Application No. 20180082 dated Dec. 13, 2018, 1 page.
Partial European Search Report received for EP Patent Application Serial No. EP18207452.6 dated Apr. 2, 2019, 16 pages.
(Continued)

*Primary Examiner* — Richard A Goldman
(74) *Attorney, Agent, or Firm* — FisherBroyles, LLP

(57) ABSTRACT

The invention is based on controlling operations of an earthmoving machine controllable by the operator by using only one to four controllers and at least one displaying means for displaying controls selectable and controllable by the one to four controllers. The selections and controls of the operations for controlling the earthmoving machine may be transmitted to the control unit both by wire and wirelessly. Thus, the one to four controllers are operable both attached and detached. Further, the control system is arranged to determine the location of the one to four controllers with respect to the earthmoving machine.

15 Claims, 2 Drawing Sheets

(51) Int. Cl.
  *E02F 9/20* (2006.01)
  *G01S 19/01* (2010.01)
  *G05B 19/409* (2006.01)
(52) U.S. Cl.
  CPC ............ *G01S 19/01* (2013.01); *G05B 19/409* (2013.01); *G05B 2219/45012* (2013.01)
(58) Field of Classification Search
  USPC ....................................................... 701/2, 50
  See application file for complete search history.

(56) References Cited

U.S. PATENT DOCUMENTS

| | | | | |
|---|---|---|---|---|
| 6,044,316 A * | 3/2000 | Mullins | ................ | A01B 69/008 701/470 |
| 6,112,139 A * | 8/2000 | Schubert | ................ | E02F 9/205 701/1 |
| 6,633,800 B1 * | 10/2003 | Ward | ................ | G05D 1/0038 701/34.2 |
| 6,691,435 B1 * | 2/2004 | Schultz | ................ | E01H 5/06 37/234 |
| 6,739,078 B2 * | 5/2004 | Morley | ................ | E02F 9/205 701/50 |
| 6,782,644 B2 * | 8/2004 | Fujishima | ................ | E02F 9/205 701/50 |
| 7,441,404 B2 | 10/2008 | Devier et al. | | |
| 7,643,890 B1 * | 1/2010 | Hillen | ................ | B23K 9/1087 700/83 |
| 7,822,514 B1 * | 10/2010 | Erickson | ................ | B60R 25/04 340/426.13 |
| 7,844,379 B2 * | 11/2010 | Tang | ................ | E04G 21/04 701/50 |
| 8,139,108 B2 * | 3/2012 | Stratton | ................ | G09B 9/048 348/121 |
| 8,272,467 B1 * | 9/2012 | Staab | ................ | G08C 17/02 701/50 |
| 8,596,373 B2 * | 12/2013 | Montgomery | ................ | E02F 3/847 172/4.5 |
| 8,666,695 B2 * | 3/2014 | Han | ................ | G06F 3/0346 73/1.79 |
| 8,944,201 B2 * | 2/2015 | Krellner | ................ | B60H 1/00378 180/89.12 |
| 8,985,263 B2 * | 3/2015 | Peterson | ................ | B60N 2/797 180/317 |
| 9,057,221 B2 * | 6/2015 | Warr | ................ | E21B 7/02 |
| 9,122,276 B2 * | 9/2015 | Kraimer | ................ | G07C 9/00309 |
| 9,206,589 B2 * | 12/2015 | Price | ................ | G08C 17/02 |
| 9,213,331 B2 * | 12/2015 | Johnson | ................ | E02F 9/205 |
| 9,213,333 B2 * | 12/2015 | Harrison | ................ | G05D 1/0038 |
| 9,235,984 B2 * | 1/2016 | Raynor | ................ | G08C 23/04 |
| 9,270,809 B2 * | 2/2016 | Allen | ................ | H04W 64/006 |
| 9,299,247 B2 * | 3/2016 | O'Neal | ................ | G08C 17/00 |
| 9,350,954 B2 * | 5/2016 | Wagreich | ................ | G05D 1/0038 |
| 9,571,629 B2 * | 2/2017 | Kadous | ................ | G06F 3/014 |
| 9,663,113 B2 * | 5/2017 | Catania | ................ | B60W 10/04 |
| 9,764,642 B2 * | 9/2017 | Anderton | ................ | B60K 37/06 |
| 9,790,695 B1 | 10/2017 | Friend et al. | | |
| 9,894,492 B1 * | 2/2018 | Elangovan | ................ | H04W 4/40 |
| 10,075,576 B1 * | 9/2018 | Rule | ................ | H04M 1/72415 |
| 10,114,370 B2 * | 10/2018 | Nelson | ................ | G05B 19/042 |
| 10,176,707 B2 * | 1/2019 | Hamain | ................ | G08C 17/02 |
| 10,382,380 B1 * | 8/2019 | Suzani | ................ | H04L 51/30 |
| 10,410,447 B2 * | 9/2019 | Ellis | ................ | G07C 9/00309 |
| 2002/0152027 A1 * | 10/2002 | Allen | ................ | G01C 21/26 701/526 |
| 2002/0180166 A1 * | 12/2002 | Voss | ................ | B62K 21/02 280/5.5 |
| 2003/0036817 A1 * | 2/2003 | Morley | ................ | E02F 9/205 700/245 |
| 2003/0161906 A1 | 8/2003 | Braunhardt et al. | | |
| 2003/0230447 A1 * | 12/2003 | Wulfert | ................ | B60R 11/02 296/190.01 |
| 2004/0030919 A1 | 2/2004 | Moriya et al. | | |
| 2005/0107898 A1 * | 5/2005 | Gannon | ................ | G06F 21/10 700/90 |
| 2006/0064223 A1 * | 3/2006 | Voss | ................ | B62K 25/04 701/52 |
| 2006/0224280 A1 * | 10/2006 | Flanigan | ................ | A63H 30/04 701/1 |
| 2006/0271263 A1 * | 11/2006 | Self | ................ | G05D 1/0033 701/2 |
| 2008/0180272 A1 * | 7/2008 | Scherer | ................ | A63H 30/04 340/13.24 |
| 2008/0254417 A1 | 10/2008 | Mohamed | | |
| 2008/0254431 A1 * | 10/2008 | Woolf | ................ | G09B 5/00 434/322 |
| 2009/0163283 A1 * | 6/2009 | Childress | ................ | A63G 31/16 463/47 |
| 2010/0100256 A1 * | 4/2010 | Jurmain | ................ | B25J 19/023 701/2 |
| 2010/0148920 A1 * | 6/2010 | Philmon | ................ | H04M 1/67 340/5.2 |
| 2011/0137491 A1 * | 6/2011 | Self | ................ | G05D 1/0033 701/2 |
| 2011/0178677 A1 * | 7/2011 | Finley | ................ | E02F 9/265 701/50 |
| 2011/0257816 A1 * | 10/2011 | Song | ................ | E02F 9/2008 701/2 |
| 2011/0282519 A1 * | 11/2011 | Carlsson | ................ | E02F 9/205 701/2 |
| 2012/0136524 A1 | 5/2012 | Everett et al. | | |
| 2012/0136525 A1 * | 5/2012 | Everett | ................ | E02F 9/2045 701/50 |
| 2012/0174445 A1 * | 7/2012 | Jones | ................ | G01S 19/53 37/197 |
| 2012/0215375 A1 * | 8/2012 | Chang | ................ | B60W 50/14 701/1 |
| 2012/0263566 A1 * | 10/2012 | Taylor | ................ | E02F 3/54 701/50 |
| 2013/0006484 A1 | 1/2013 | Avitzur et al. | | |
| 2013/0197720 A1 * | 8/2013 | Kraimer | ................ | G05D 1/0033 701/2 |
| 2013/0311153 A1 | 11/2013 | Moughler et al. | | |
| 2014/0019913 A1 * | 1/2014 | Newman | ................ | G06F 3/04883 715/810 |
| 2014/0060216 A1 * | 3/2014 | Smith | ................ | G09B 9/04 73/865.6 |
| 2014/0172128 A1 | 6/2014 | Johnson et al. | | |
| 2014/0240086 A1 * | 8/2014 | Van Wiemeersch | .... | B60R 25/25 340/5.51 |
| 2015/0004573 A1 * | 1/2015 | Bomer | ................ | G09B 19/167 434/219 |
| 2015/0120089 A1 * | 4/2015 | Peel | ................ | B60T 7/16 701/2 |
| 2016/0031417 A1 * | 2/2016 | Kornek | ................ | B60R 25/24 701/2 |
| 2016/0076228 A1 | 3/2016 | Nau | | |
| 2016/0205864 A1 | 7/2016 | Gattis et al. | | |
| 2017/0089032 A1 | 3/2017 | Hokkanen et al. | | |
| 2017/0168501 A1 * | 6/2017 | Ogura | ................ | G05D 1/0278 |
| 2017/0292248 A1 | 10/2017 | Matson et al. | | |
| 2017/0336630 A1 | 11/2017 | Cummings et al. | | |
| 2018/0190106 A1 * | 7/2018 | Hamain | ................ | G06F 3/017 |
| 2018/0258616 A1 * | 9/2018 | Kiyota | ................ | G06T 1/00 |
| 2018/0282973 A1 * | 10/2018 | Ono | ................ | G05D 1/0022 |
| 2018/0368136 A1 * | 12/2018 | Lien | ................ | H04L 5/0053 |
| 2019/0072984 A1 * | 3/2019 | Dougherty | ................ | B64C 39/024 |
| 2019/0152440 A1 * | 5/2019 | Farges | ................ | B60R 25/246 |
| 2019/0161939 A1 | 5/2019 | Hokkanen et al. | | |
| 2019/0161942 A1 * | 5/2019 | Hokkanen | ................ | E02F 9/2004 |
| 2019/0202442 A1 * | 7/2019 | Lavoie | ................ | H04W 4/023 |
| 2019/0204825 A1 * | 7/2019 | Golgiri | ................ | G05D 1/0055 |
| 2019/0258238 A1 * | 8/2019 | Lavoie | ................ | G05D 1/0016 |
| 2019/0331761 A1 * | 10/2019 | Wynn | ................ | G01S 11/12 |
| 2019/0338809 A1 * | 11/2019 | Clark | ................ | G05D 1/0223 |
| 2020/0018049 A1 * | 1/2020 | Takahama | ................ | E02F 9/2025 |
| 2020/0029213 A1 * | 1/2020 | Nölscher | ................ | B60R 25/24 |
| 2020/0073527 A1 * | 3/2020 | Bandishti | ................ | G05D 1/0061 |

(56) References Cited

U.S. PATENT DOCUMENTS

| | | | |
|---|---|---|---|
| 2020/0262338 A1* | 8/2020 | Salter | B60Q 1/50 |
| 2020/0299930 A1* | 9/2020 | Wuisan | E02F 9/2012 |
| 2022/0058047 A1* | 2/2022 | Epstein | G06F 9/45558 |

FOREIGN PATENT DOCUMENTS

| | | | |
|---|---|---|---|
| CN | 102770604 A | | 11/2012 |
| CN | 202644604 U | | 1/2013 |
| CN | 106715800 A | | 5/2017 |
| CN | 109837941 A | | 6/2019 |
| DE | 10 2005 049 550 A1 | | 6/2006 |
| DE | 102013113801 A1 | | 6/2015 |
| DE | 10 2016 004 266 A1 | | 10/2017 |
| EP | 1004230 A2 | | 5/2000 |
| EP | 1883871 A2 | | 2/2008 |
| EP | 3 489 421 A2 | | 5/2019 |
| EP | 3 489 422 A2 | | 5/2019 |
| EP | 3 489 423 A2 | | 5/2019 |
| GB | 2 342 640 A | | 4/2000 |
| JP | H01-127731 A | | 5/1989 |
| JP | 2003-082701 A | | 3/2003 |
| KR | 10-1695914 B1 | | 1/2017 |
| WO | 00/43866 A1 | | 7/2000 |
| WO | 2006/130497 A2 | | 12/2006 |
| WO | 2017/176773 A1 | | 10/2017 |

OTHER PUBLICATIONS

Search Report for Finland Patent Application Serial No. 20180081 dated Nov. 23, 2018, 1 page.
Office Action received for Finland Patent Application Serial No. 20180081 dated Nov. 23, 2018, 6 pages.
Partial European Search Report received for EP Patent Application Serial No. EP18207450.0 dated Apr. 2, 2019, 15 pages.
Office Action received for Finland Patent Application Serial No. 20180082 dated May 7, 2019, 6 pages.
First Office Action received in Chinese Patent Application Serial No. 201811387401.1 dated Oct. 16, 2020, 20 pages. (Including English Translation).
First Office Action received in Chinese Patent Application Serial No. 201811387402.6 dated Oct. 16, 2020, 8 pages.
Partial Search Report issued by the European Patent Office in relation to corresponding EP Patent Application No. EP 18207447.6, dated Apr. 2, 2019, 17 pgs.
Second Office Action received for Chinese Patent Application Serial No. 201811387397.9 dated Jul. 15, 2021, 14 pages. (Including English Translation).
Third Office Action received for Chinese Patent Application Serial No. 201811387397.9 dated Jun. 22, 2022, 24 pages. (Including English Translation).
Notification of Fourth Office Action received for Chinese Application No. 201811387397.9 dated Sep. 1, 2022, 17 pages (Including English Translation).

* cited by examiner

CONTROLLING EARTHMOVING MACHINES

CROSS-REFERENCE TO RELATED APPLICATION

This application claims the benefit of Finnish Patent Application No. 20176052, filed on Nov. 24, 2017, the disclosure of which is incorporated herein by reference in its entirety.

BACKGROUND

Field

The invention relates to a control system, an apparatus, a computer program product and a computer program embodied on a non-transitory computer readable storage medium for controlling an earthmoving machine.

Description of the Related Art

Different types of earthmoving machines may be utilized at different work sites for moving soil or rock material to another location or to process them into a desired shape. Earthmoving machines are used in excavation work and road construction, for example. Earthmoving machines have user interfaces containing multiple controllers and multiple displaying means for an operator to interact with the earthmoving machine.

SUMMARY

An object of the present invention is to provide a novel and improved control system for an earthmoving machine. Further object is to provide a novel and improved earthmoving machine equipped with the control system.

The objects of the invention are achieved by what is stated in the independent claims. Embodiments of the invention are disclosed in the dependent claims.

The invention is based on the idea of controlling the operations of the earthmoving machine controllable by the operator by using only one to four controllers and at least one displaying means for displaying controls selectable and controllable by the one to four controllers. The selections and controls of the operations for controlling the earthmoving machine may be transmitted to control unit both by wire and wirelessly. Thus, the one to four controllers are operable both attached and detached. Further, the control system is arranged to determine the location of the one to four controllers with respect to the earthmoving machine.

An advantage of the control system of the invention is that the operator of the earthmoving machine may customize the way for controlling the operations of the earthmoving machine with the one to four controllers according to his or her own desires. Another advantage is that the operator need not to reach out any other buttons or switches in any case if desired.

According to an embodiment, the operation mode of the one to four controllers in the disclosed control system depends on whether each of the one to four controllers are attached or detached.

According to an embodiment, the operation mode of each of the one to four controllers, when detached, depends on the distance between these controllers and the earthmoving machine.

According to an embodiment, the operation mode of each of the one to four controllers, when detached, depends on the distance between these controllers and the earthmoving tool of the earthmoving machine.

According to an embodiment, the earthmoving tool of the earthmoving machine moves in three dimensional space according to coordinate system set at least one of: manually, semiautomatically and automatically taking into account at least one of: the location of the operator, the orientation of the operator, the location of the one to four controllers and the orientation of the one to four controllers with respect to at least one of the location and orientation of at least one of the earthmoving tool and the earthmoving machine.

According to an embodiment, the operation mode of each of the one to four controllers, when detached, depends on the distance between each other.

According to an embodiment, the amount of the controllers is two to four and the operation mode of each of the two to four controllers, when detached, depends on the distance between each other.

According to an embodiment, the operation mode of each of the one to four controllers depends on the distance between a detected obstacle and at least one of the earthmoving tool and the earthmoving machine.

According to an embodiment, the operation mode of the one to four controllers depends on the user specified adjustments made by or made for the user currently logged in to the control system.

According to an embodiment, the extent of the available adjustments depends on the skill level data of the user currently logged in, the skill level data being defined by at least one of: usage hours of the earthmoving machine, usage hours of the respective earthmoving machine, competence level, the competence level being at least one of accomplished and passed by at least one of an examination or test.

According to an embodiment, the operation of the earthmoving machine controllable by the one to four controllers is at least one of: driving system, peripheral device, maintenance system, road navigation system, work site navigation system, positioning the earthmoving tool with respect to the work site, moving the earthmoving tool in relation to the carrier, weighing system, automation system, measuring system and process control.

According to an embodiment, the control system gives feedback by at least one of the following signals: graphical, augmented reality, virtual reality, audiovisual, visual illumination, haptics and force-feedback.

According to an embodiment, the user with administrator privileges define the skill level by editing the skill level data of the user.

According to an embodiment, the user with administrator privileges define the skill level by editing the skill level data of the user in a cloud service and the earthmoving machine retrieves the data from the cloud service.

According to an embodiment, the at least one control unit is configured to receive selections and controls from the one to four controllers for controlling at least the tool and the driving of the earthmoving machine.

According to an embodiment, the at least one control unit is configured to receive selections and controls from the one to four controllers for controlling at least one of: moving the tool in relation to the carrier and the driving of the earthmoving machine.

According to an embodiment, the at least one control unit is configured to receive selections and controls from the one to four controllers for controlling all the operations of the earthmoving machine controllable by the operator of the earthmoving machine.

According to an embodiment, the amount of controllers is two.

According to an embodiment, the earthmoving machine is one of the following: excavator, bulldozer, motor grader, compaction machine, piling machine, deep stabilization machine, surface top drilling machine.

According to an embodiment there is further a computer program product comprising executable code that when executed, cause execution of functions according to claim 1.

According to an embodiment there is further a computer program e bodied on a non-transitory computer readable storage medium, the computer program being configured to control a processor to execute functions according to claim 1.

The above-disclosed embodiments may be combined to form suitable solutions provided with necessary features disclosed.

BRIEF DESCRIPTION OF THE DRAWINGS

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION

Figure 1:
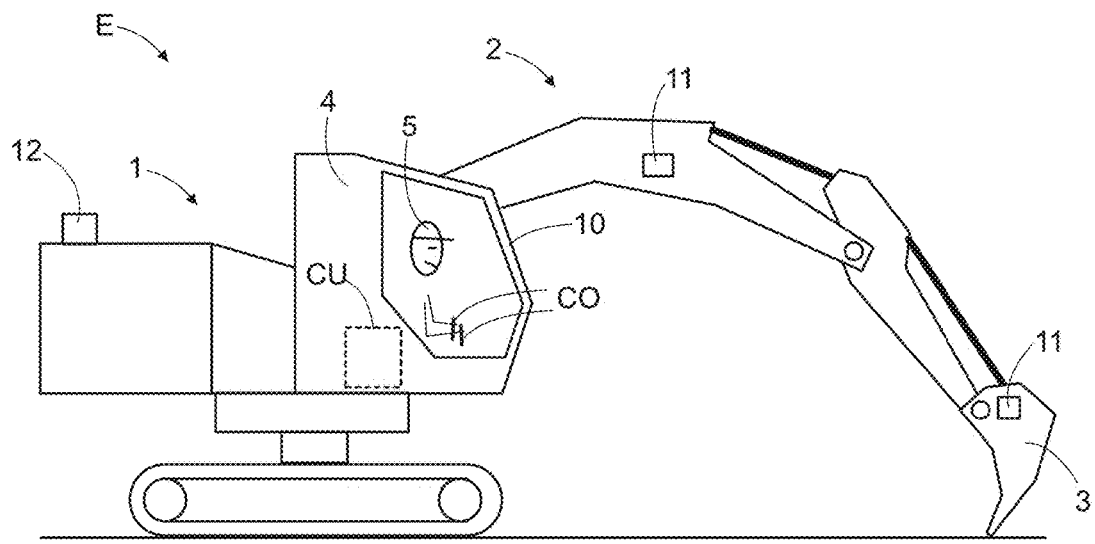
FIG. 1 is a schematic side view of an excavating machine provided with two controllers.

FIG. 1 shows an earthmoving machine E, which is in this case an excavator comprising a movable carrier 1 on which a boom 2 is arranged. At a distal end of the boom 2 is a tool 3, in this case a bucket. The boom 2 may be moved in a versatile manner. The operator 5 may select the manner how the boom 2 and the bucket responds to the controls of the controllers CO. The user may prefer in some cases semiautomatic controlling, where the bucket moves in a preconfigured or preprogrammed manner according to given controls and in the other cases the user may prefer more traditional way, for example, by controlling the bucket such that each joint in the boom 2 and the bucket are controlled separately. The earthmoving machine comprises actuating means for moving the earthmoving tool in relation to the carrier 1. These actuating means may comprise for example different kind of electrical, mechanical and hydraulic arrangements, possibly including for example different kinds of pumps, actuating cylinders or control valves, and other kind of means generally known for a person skilled in the art for realizing slewing, rotating, tilting, zooming and other similar movements of the tool 3 and the machine E.

On the carrier 1 is a control cabin 4 for an operator 5. Inside the cabin 4 is a displaying means, which comprises, for example, at least one transparent display unit 6 through which the operator 5 may monitor operation of the tool 3 and display controls selectable and controllable. The display unit 6 may also be some other kind. Additionally, the displaying means, part of the displaying means or the display unit 6 may be wireless or detachable like the controllers CO.

FIG. 1 further discloses that the earthmoving machine E and its operational components may be equipped with sensors 11 and measuring devices for gathering position data and sense the surroundings and the location of the controllers CO, for example. Moreover, the earthmoving machine E may comprise one or more navigation or position determining systems 12, such as a global navigation satellite system (GNSS), for determining position and direction of the earthmoving machine E.

According to an embodiment, skill level, user account or both may at least one of force, entitle, deny and limit the usage of at least some controls, features or both.

According to an embodiment, an experienced operator 5 desires to use four controllers CO, one for both hands and one for both feet, and the semiautomatic controls where the operator 5 may control the bucket, for example, to go left, right, forward, backward, up and down. The operator 5 may also select at which degree with respect to horizontal or vertical plane the bucket goes to these directions. The controllers CO used by feet he desires to drive the earthmoving machine E. The other foot may control the speed and whether to go forward or backward and the other foot may control whether to go straight or to turn left or right, for example. When driving the earthmoving machine, the controlling of the bucket, i.e. the tool, may include at least one of controlling the tool as such, like a position or alignment of the tool, and controlling the moving of the earthmoving tool in relation to the carrier.

The user may select from various alternatives which kind of feedback signals he or she desires at each situation in each earthmoving machine E. Selectable feedback signals are at least: graphical, augmented reality, virtual reality, audiovisual, visual illumination, haptics and force-feedback.

Automatic or semiautomatic controls, as well as any other data relating to earthmoving machine E, may be preprogrammed into the control unit CU. New automatic and semiautomatic controls may be programmed by the operator 5 or the operator 5 may download preprogrammed or preconfigured automatic or semiautomatic controls, for example as a data packet, from a cloud service where the earthmoving machine E or the user has access to. The user may, for example, log into his or her user account or identify himself or herself using any known method into the earthmoving machine E or into the cloud service or the user may log or identify the earthmoving machine E into the cloud service and select the data packets he or she desires and has access to and download them. Data packets may be downloaded in every other known way, as well. Preferably, a user with administrator privileges may download the data packets the operator 5 requested.

For example, for unexperienced operator 5 it might be preferable to limit the maximum speed of the driving in work site as well as the motion controls of the earthmoving machine E. Preferably, controls may have some other limitations or prerequisites to function such as whether the controllers CO are attached or detached, and whether detached, regarding the location of the controllers CO. For example, if the controllers CO are too far, the control system CS may disable the controllers CO and if the controllers CO are too near, the control system CS may slow down the motions.

Preferably, the control system CS may be set to detect automatically or manually, in addition to the location of the operator 5, the direction or orientation of the operator 5 with respect to the direction or orientation and location of the earthmoving machine E, the boom 2 or the tool 3 and change the controls with respect to these directions or orientations. For example, when the operator 5 is outside the cabin facing the earthmoving machine E and the boom 2, controlling the tool 3 to go left as seen by the operator 5, the tool 3 may go left as seen by the side of the operator 5 and to right as seen by the side of the earthmoving machine E.

Figure 2:
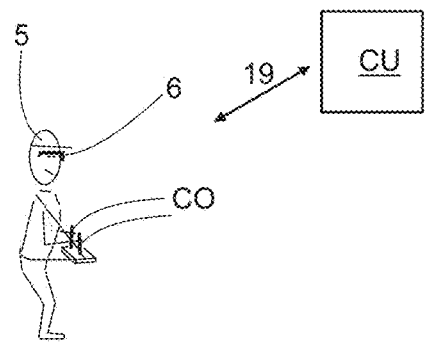
FIG. 2 is a schematic view of an operator operating an earthmoving machine outside the cabin.

FIG. 2 discloses an operator 5 controlling an earthmoving machine E from outside the cabin 4. The operator 5 has a vest where the controllers CO are attached and a headset 18 provided with one or two head-mounted display units 6 depicted in FIG. 5. The head-mounted display with the controllers CO enables the operator 5 to operate the control system CS outside the cabin 4 like using the control system CS inside the cabin 4. Both the controllers CO and the headset 18 communicate with one or more control units CU through one or more communication channel 19. The headset 18 may be used inside the cabin 4, as well. When using the headset 18 inside the cabin 4, the displaying means in the cabin 4 may be switched off if desired.

According to an embodiment, an operator selects to use only two controllers CO for controlling the operations of the earthmoving machine E. In the embodiment, the operator 5 is well experienced to use them so the operator 5 may detach the controllers CO and step outside the cabin 4 and continue, for example, after 5 second delay or one meter away from the earthmoving machine E, controlling the earthmoving machine E outside the cabin 4 with otherwise full control, but, when driving the earthmoving machine E outside the cabin 4, the maximum speed is limited to 0.5 km/h, for example.

According to an embodiment, the control system CS comprises two controllers CO.

According to an embodiment, an operator 5 has another set of controllers CO that the operator 5 uses when operating with detached controllers CO. Thus, the operator 5 need not to detach those controllers CO that are attached in the cabin 4.

According to an embodiment, the sets of controllers CO each have a selector, for example a switch or a button or the like, to select whether the set of controllers CO is operating or not operating. If more than one set of controllers CO is at the same time set to "operating" the certain earthmoving machine E, the closest set to the earthmoving machine overrides the other sets. This means that if attached set of controllers CO is set to "operating", it overrides the others and if the attached set is set to "not operating", the control system CS of the earthmoving machine E determines which of the controllers CO set to "operating" is the closest to the earthmoving machine E and lets the closest to operate and disables the others. If there is two sets equidistant to the earthmoving machine E set to "operating", the control system CS may disable one or both and somehow signal that too more sets of controllers CO is set to "operating" mode.

According to an embodiment, the set of controllers CO operating the earthmoving machine E may operate the earthmoving machine E over the Internet or other suitable connection such that the operator 5 need not be within sight to the earthmoving machine E. These solutions may be suitable for mining purposes, for example. Thus, the operator 5 may operate the earthmoving machine E from outside the mine, for example. According to the embodiment, the operator 5 may have an additional visual connection (not shown) to the tool 3, surroundings of the earthmoving machine E or both via one or more video cameras (not shown) attached at suitable places in the earthmoving machine E such as carrier 1, cabin 4, boom 2 or tool 3.

The level of experience, or the skill level, may be set to the control system CS manually by, for example, the operator 5 or the user with administrator privileges. The skill level may be set also by the control system CS itself, for example, by analyzing all the time the selections and controls given by the operator 5 or by retriving the history data gathered from the operator 5, meaning the user logged in, regarding the selections and controls given by the user or both. History data may have been gathered both from the earthmoving machine E, from similar earthmoving machine, from any other earthmoving machine, from any other similar machine and a simulator simulating some or any of the previously mentioned.

Analyzing selections and controls may contain, for example, data about how fast the user makes selections in between different menu items or jumps from one menu to the other or how quick or smooth the controls are in controlling, for example, driving system, peripheral devices, maintenance system, road navigation system, work site navigation system, positioning the earthmoving tool 3 with respect to the work site, weighing system, automation system, measuring system and process control.

According to an embodiment, the skill level may be different regarding what is been controlled, such that one operator, or user, may have high skill level in controlling the tool 3 and the other may have high skill level in using the driving system and so on.

The data regarding each user, or operator, may contain information of each user's experience regarding various earthmoving machines E and may be at least one of gathered, uploaded and downloaded by the earthmoving machine E, uploaded and downloaded by the user and the operator and uploaded and downloaded by the user with administrator privileges. Here uploading means transmitting the gathered data from the control system CS to the cloud service or identity card or the like and downloading means retrieving the history data or skill level data from the cloud service or identity card or the like to the control system CS. Each earthmoving machine E may monitor the usage of the controllers CO in each situation, analyze it, gather it and upload it. The user with administrator privileges or the user himself or herself may insert the data according to his knowledge of the user's experience regarding to each kind of earthmoving machine E, for example, according to a test or an examination performed or passed.

The limitation, for example, to the maximum speed may be set by the supervisor of the work site, by the operator 5 himself or by the control system CS that has the data of the controlling hours outside the cabin operated by the operator 5. When controlling the earthmoving machine E outside the cabin 4, the headmounted display units 6 or the like or any other display unit 6 is not mandatory. Using the controllers CO without seeing any display unit 6 does not necessarily restrict the current use of the earthmoving machine E, if the user remembers the selections needed without seeing them on any display.

According to an embodiment, when the sensors sensing the surroundings of the tool 3 detect that the operator is in only one meter distance from the tool 3, the control system CS restricts the motion speeds of the earthmoving machine E, the boom 2 and the tool 3 to, for example, 20% of the motion speeds set in unrestricted conditions to the operator 5.

Figure 3:
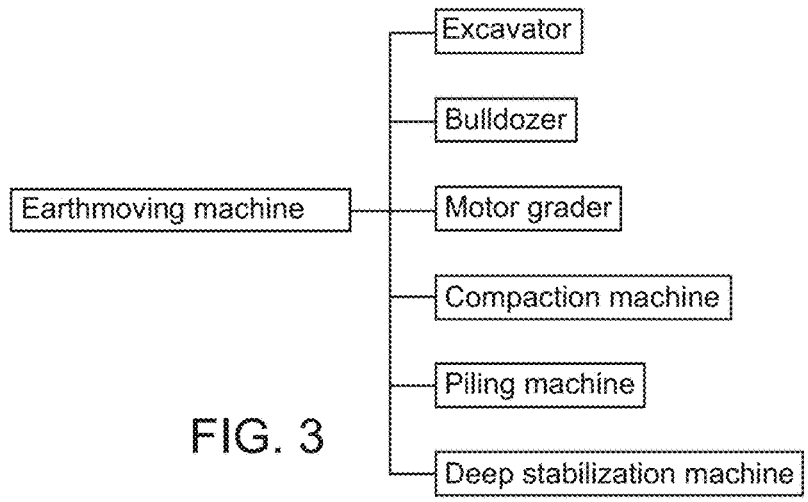
FIG. 3 is a schematic diagram showing some feasible earthmoving machines.

FIG. 3 show feasible earthmoving machines. Regarding the earthmoving machine and the habits of the user, the number of the controllers CO may vary. Optimal amount of controllers CO in excavator is two. Also the amount of the controllers CO may be one, three or four. If the amount is three or four, one or two of them may be usable by feet, for example. Not all the controllers CO need be detachable. If only part of the controllers CO were detached, the operation mode of each controller CO may change, since the controllers CO not detached may be disabled and the features of the disabled controllers CO may be added to the controllers CO detached. Preferably the control system CS requests user action whether to change the operation mode or not.

Figure 4A:
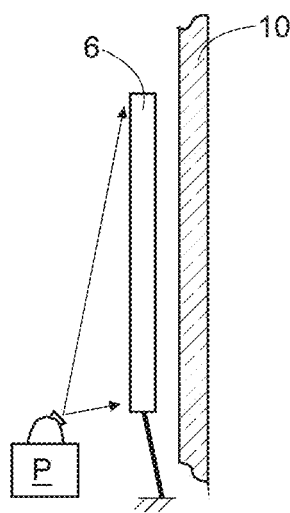
FIGS. 4a-4c are schematic side views of some possible arrangements for displaying earthmoving images on a transparent display unit.
Figure 4B:
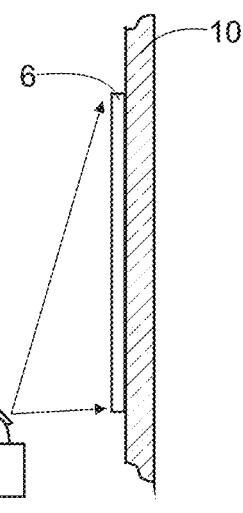
Figure 4C:
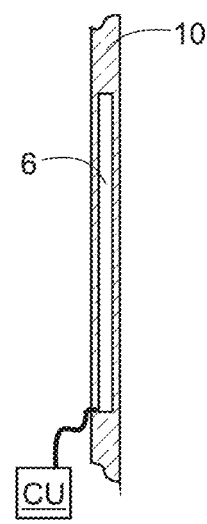

FIG. 4a discloses a separate transparent display unit 6 or combiner arranged at a distance from a windscreen 10. FIG. 4b discloses a solution wherein a combiner 6 is fastened to an inner surface of the windscreen 10. FIG. 4c discloses an integrated solution wherein the transparent display unit 6 is located inside a structure of the windscreen 10.

Figure 5:
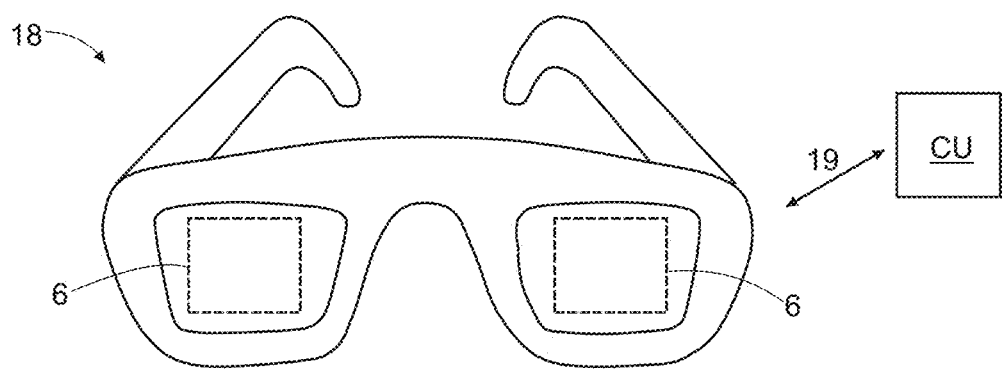
FIG. 5 is a schematic front view of a headset provided with one or two head-mounted display units.
Figure 6:
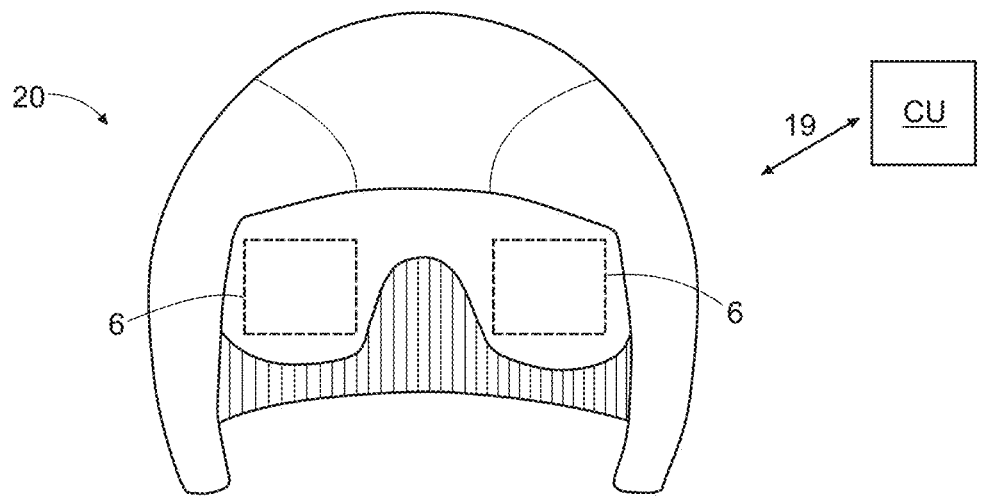
FIG. 6 is a schematic front view of a helmet provided with a head-mounted display unit.

FIG. 5 discloses a headset 18 or media glasses provided with one or more transparent display units 6. The headset 18 may communicate with one or more external or internal control units CU through one or more data communication 19. The same applies also for a helmet 20, depicted in FIG. 6, which is also provided with the transparent display units 6. In both arrangements the earthmoving images and data elements may be displayed so that they appear to locate at a visual distance from the transparent display units 6, which are located close to eyes of the operator.

It will be obvious to a person skilled in the art that, as the technology advances, the inventive concept can be implemented in various ways. The invention and its embodiments are not limited to the examples described above but may vary within the scope of the claims.

What is claimed is:

1. A control system for controlling an earthmoving machine, the earthmoving machine comprising a controller operable by hand, wherein an operator operates by the controller at least a driving system and an earthmoving tool of the earthmoving machine, the control system comprising:
    at least one control unit; and
    at least one display operable to display control options containing the operations of the earthmoving machine selectable and controllable by the controller to select an operation of the earthmoving machine to control from the displayed control options to control the selected operation;
    wherein the at least one control unit is configured to receive operator selections and control signals from the controller, wherein the selections and control signals indicate operations of the earthmoving machine controllable by the controller, wherein the controller is operable to operate at least the driving system and the earthmoving tool of the earthmoving machine both when attached to the earthmoving machine and when detached from the earthmoving machine, wherein an operation mode of the controller depends on whether the controller is attached to the earthmoving machine or detached from the earthmoving machine, wherein, when detached from the earthmoving machine, the controller is operable to limit a maximum driving speed and motion controls of the earthmoving tool, and wherein the limitation is set by at least one of: a supervisor of the worksite, the operator of the earthmoving machine, or the control system of the earthmoving machine.

2. The control system according to claim 1, wherein the operation mode of the controller, when detached, depends on a distance between the controller and the earthmoving machine.

3. The control system according to claim 1, wherein the operation mode of the controller, when detached, depends on a distance between the controller and an earthmoving tool of the earthmoving machine.

4. The control system according to claim 1, wherein an earthmoving tool of the earthmoving machine moves in three dimensional space according to a coordinate system set to at least one of: manually, semiautomatically, and automatically; taking into account at least one of: a location of an operator, an orientation of the operator, a location of the controller, and an orientation of the controller with respect to at least one of: a location and an orientation of at least one of: the earthmoving tool and the earthmoving machine.

5. The control system according to claim 1, wherein the operation mode of the controller depends on user specified adjustments made by or made for a user currently logged in to the control system.

6. The control system according to claim 5, wherein an extent of the user specified adjustments depends on a skill level data of the user currently logged in.

7. The control system according to claim 1, wherein an operation of the earthmoving machine that is further controllable by the controller includes operation of at least one of a peripheral device, a maintenance system, a road navigation system, a work site navigation system, an earthmoving tool with respect to a work site, the earthmoving tool in relation to a carrier, a weighing system, an automation system, a measuring system, and a process control.

8. The control system according to claim 1, wherein the control system gives feedback by at least one of the following signals: graphical, augmented reality, virtual reality, audio-visual, visual illumination, haptics, and force-feedback.

9. The control system according to claim 6, wherein a user with administrator privileges defines for the user a skill level by editing the skill level data of the user.

10. The control system according to claim 9, wherein the user with administrator privileges defines for the user the skill level by the editing of the skill level data of the user in a cloud service and the earthmoving machine retrieves the skill level data from the cloud service.

11. The control system according to claim 1, wherein the at least one control unit is configured to receive selections and control signals from the controller controlling at least one of: moving a tool in relation to a carrier and driving of the earthmoving machine.

12. The control system according to claim 1, wherein the at least one control unit is configured to receive selections and control signals from the controller controlling all operations of the earthmoving machine controllable by an operator of the earthmoving machine.

13. An earthmoving machine, the earthmoving machine comprising:
    a movable carrier;
    at least one earthmoving tool;
    a controller operable by hand, wherein an operator operates by the controller at least a driving system and the earthmoving tool of the earthmoving machine;
    peripheral devices;
    actuators operable to move the earthmoving tool in relation to the carrier;
    wherein the controller is further operable to control the peripheral devices;

a control system comprising at least one control unit, wherein the at least one control unit controls operations of the earthmoving machine;

wherein the control system comprises at least one display unit operable to display control options comprising the operations of the earthmoving machine selectable and controllable by the controller to select an operation of the earthmoving machine to control, from the displayed control options, the selected operation, wherein an operator operates by the controller at least a driving system of the earthmoving machine, wherein the at least one control unit is configured to receive operator selections and control signals from the controller, wherein the selections and control signals indicate operations of the earthmoving machine controllable by the controller, wherein the controller is operable to operate at least the driving system and the earthmoving tool of the earthmoving machine both when attached to the earthmoving machine and when detached from the earthmoving machine, and wherein an operation mode of the controller depends on whether the controller is attached to the earthmoving machine or detached from the earthmoving machine, wherein, when detached from the earthmoving machine, the controller is operable to limit a maximum driving speed and motion controls of the earthmoving tool, and wherein the limitation is set by at least one of: a supervisor of the worksite, the operator of the machine, or the control system of the earthmoving machine.

14. The earthmoving machine according to claim 13, wherein the earthmoving machine includes one of the following: an excavator, a bulldozer, a motor grader, a compaction machine, a piling machine, a deep stabilization machine, or a surface top drilling machine.

15. A method for controlling an earthmoving machine, wherein the earthmoving machine comprises a controller operable by hand, wherein an operator operates by the controller at least a driving system and an earthmoving tool of the earthmoving machine, wherein the method comprises:

determining an operation mode of the controller by determining whether the controller is attached to the earthmoving machine or detached from the earthmoving machine, wherein the controller is operable to operate at least the driving system and the earthmoving tool of the earthmoving machine both when attached to the earthmoving machine and when detached from the earthmoving machine, and, when detached from the earthmoving machine, the controller is operable to limit a maximum driving speed and motion controls of the earthmoving tool, and wherein the limitation is set by at least one of: a supervisor of the worksite, the operator of the earthmoving machine, or the control system of the earthmoving machine;

selecting using the controller by the operator, in the determined operation mode, an operation to control from displayed selectable and controllable control options indicating operations of the earthmoving machine controllable by the controller; and controlling the selected operation of the earthmoving machine.

\* \* \* \* \*